United States Patent
Crabill et al.

[11] Patent Number: 5,265,024
[45] Date of Patent: Nov. 23, 1993

[54] PILOTS AUTOMATED WEATHER SUPPORT SYSTEM

[75] Inventors: Norman L. Crabill, Newport News; Ernie R. Dash, Grafton; Scott T. Shipley, Fairfax, all of Va.

[73] Assignee: Vigyan, Inc., Hampton, Va.

[21] Appl. No.: 681,190

[22] Filed: Apr. 5, 1991

[51] Int. Cl.[5] ............................................. G06F 15/50
[52] U.S. Cl. .................. 364/443; 364/420; 342/26; 73/178 R
[58] Field of Search ........... 364/443, 444, 439, 424.06, 364/420, 456; 73/178 R; 342/26, 30

[56] References Cited
U.S. PATENT DOCUMENTS

| | | | |
|---|---|---|---|
| 3,750,166 | 7/1973 | Dearth | 342/30 |
| 4,347,618 | 8/1982 | Kavouras et al. | 342/26 |
| 4,521,857 | 6/1985 | Reynolds, III | 364/439 |
| 4,611,209 | 9/1986 | Lemelson et al. | 364/456 |
| 4,642,775 | 2/1987 | Cline et al. | 364/443 |
| 4,706,198 | 11/1987 | Thurman | 364/439 |
| 5,049,886 | 9/1991 | Seitz et al. | 342/26 |
| 5,111,400 | 5/1992 | Yoder | 364/424.06 |

*Primary Examiner*—Gary Chin
*Attorney, Agent, or Firm*—Wallace J. Nelson

[57] ABSTRACT

A system and process for providing systematic, updated, weather information from the ground to the pilot of an aircraft are disclosed. A ground station receives and assimilates weather data for satellite broadcast as digital weather data that is received by an aircraft (while on the ground or while airborne) within the satellite coverage area, encoded by a flight processor, and shown on a display screen to the pilot in map-type depictions and alpha-numeric format tailored to the operational needs of the pilot. The flight processor provides near real-time automatic processing and comparison of surface weather observations with the applicable forecast in both text and map depictions. The display screen information is controlled by a control panel that permits the pilot to select the departure, destination, alternate and any arbitrary airport with this selection establishing the map boundaries and with the projected flight path marked thereon.

10 Claims, 7 Drawing Sheets

PILOTS AUTOMATED WEATHER SUPPORT SYSTEM

ORIGIN OF THE INVENTION

This invention was made with Governmental support under Contract NAS1-18585 awarded by the National Aeronautics and Space Administration and, accordingly, the United States Government has certain rights in the invention.

FIELD OF THE INVENTION

This invention relates generally to aircraft weather information systems and relates specifically to an automated weather support system to provide systematic, updated, weather information from the ground to the pilot of an aircraft during flight or while on the ground.

BACKGROUND OF THE INVENTION

For obvious safety reasons, pilots need timely, accurate weather data to make informed decisions both in preflight planning and while in flight. For flight planning purposes, the pilot needs to know at least the current weather conditions at the departure location and the forecast conditions for the intended route of flight, as well as forecasts for the planned destination and any required alternates. Once enroute, the pilot must maintain a real-time awareness of the actual, as well as forecast conditions for the remaining route of flight and the intended destination and alternates.

The present National Airspace System (NAS) weather support system can provide extensive weather data for preflight planning but, due to the wide variance in the quality and quantity of support available throughout the network, the system is inefficient and frequently ineffective. Also, this system demands too much human effort and pilot-ATC (air traffic controller) interaction. While the present system can provide extensive weather data, especially for preflight planning, that data is frequently received only verbally or in alpha-numeric form since many pilots today must depend on remote weather briefing support. Under these circumstances, the presently available system provides verbal telephone briefing for the pilot to acquire and assimilate the weather information needed to make preflight decisions. If a personal computer is available, then the pilot may also have alpha-numeric printouts of current and forecast weather conditions and in some cases, standardized plots may be obtained. These plots are generally of limited usefulness due to their age or sparseness of information.

When in-person weather briefing support is provided, weather maps and charts of current and forecast weather conditions are available along with (in some cases) weather satellite pictures and weather radar displays. These graphic and pictorial displays assist the pilot in visualizing and understanding or assimilating the current and forecast weather patterns. Once enroute, the pilot must currently "pull" almost all weather data from the system by various request-reply methods, thus relying on the pilot's intuition to pull the right data at the right time. Then the pilot must mentally assimilate the data received while still flying the aircraft. To further compound this labor intensive process, both tasks (flying the aircraft and assimilating the weather data) become more demanding as the weather conditions become more complex and potentially hazardous.

Thus, the present NAS weather support system is inefficient and frequently ineffective because it demands so much human effort and interaction. It has been shown that, in a four hour general aviation flight over a 500 mile route with thunderstorms forecast at about the halfway point, the NAS weather support system would produce almost 2000 individual weather observations and forecasts which could be used in assimilating a detailed weather picture for preflight planning and in-flight monitoring. It is obviously impractical for the pilot to currently get and assimilate this amount of data directly. Therefore, the normal practice is for the pilot to concentrate on the weather at the destination and the alternates during preflight and, while in-flight, to get enroute weather ad hoc from on-board observations or from the air traffic controllers (ATC) in the form of sketchy radar observations or Pilot Reports (PIREPs). The pilot may also leave the ATC frequency and request similar data from Enroute Flight Advisory Service (EFAS) or the Flight Service Station (FSS) by voice. The destination and alternate weather conditions can be obtained using these same channels, or when close enough, from the local Automatic Terminal Information System (ATIS).

The timeliness, quality and quantity of weather observations and forecasts in the present NAS weather support system are not always adequate to meet the needs of aviation flight operations. While large quantities of data may currently be available, the geographic and time spacing of the data may still not be sufficient to adequately depict the existing weather conditions. Further, the current weather forecast products are frequently too generalized and are not always accurate. As the weather changes and unforecast conditions occur, timely forecast amendments are not always generated and provided to the pilots in an effective, efficient and fail-safe mode. The critical impact of adverse weather on flight operations, coupled with the current limitations in the present NAS weather support system, make it imperative that the pilot monitor all available weather information affecting his flight.

Planned improvements in the NWS and FAA aviation weather systems will provide more observations and more detailed forecasts which will vastly increase the amount of data available for presentation to the pilot. There is thus a definite need in the art for an automated weather data delivery system that will systematically supply near real-time weather data to those using the airways.

It is therefore an object of the present invention to provide an automatic system for the pilot of an aircraft to acquire, assimilate and display weather data for preflight and in-flight decision support.

It is a further object of the present invention to provide an automatic weather data system that improves flight safety, aircraft utility and efficiency in pilot-ATC interactions.

Another object of the present invention is to provide a systematic broadcast of digital routine surface and aloft weather data updates and forecasts in discrete time windows over a data link via a communications satellite to an aircraft having a processor and display system on-board to process and display the broadcast weather data to the aircraft pilot.

A further object of the present invention is to provide an on-board processor on an aircraft that is programmable by the aircraft pilot to automatically select the map area for display of weather data broadcast from a ground weather station and relayed by a communications satellite.

An additional object of the present invention is to provide an on-board processor and display device on an aircraft that receives and displays digital broadcast weather data from a ground station in map-style depictions and as alpha-numeric formats tailored to the operational needs of the pilot.

A still further object of the present invention is to provide overlay capability to a weather display device on an aircraft for comparison of near real-time interrelated mosaicked ground weather radar maps, lightning, and the like, on the surface weather depictions being received by the weather display device.

Another object of the present invention is to provide a system that supplies pilot in-flight information that gives a systematically updated assessment of the actual and expected weather, at the appropriate resolution in time and space along his route and at his destination and alternate, in a form that is easy to acquire and use.

SUMMARY OF THE INVENTION

The foregoing and additional objects of the present invention are attained by providing a central weather data acquisition and processing station to gather, assimilate and edit weather information from a variety of sources. The weather information is edited and packaged into compressed coded digital data blocks, usually of five minute lengths, and transmitted as digital signals to the ground transmitter of a satellite communications system. This transmission is via an uplink data stream and, typically, at 6 Ghz. The satellite communication system then provides a direct broadcast (typically at 1.6 Ghz) of the suitably coded weather information to all aircraft within its coverage area, either in the air, or on the surface of the earth. The rebroadcast data blocks may be picked up by an antenna on any aircraft flying, or on the ground, within the coverage area. The received data blocks are expanded and decoded, if needed, by a flight processor on-board the aircraft into several types of graphic depictions for display on a small screen and using a standard map with shapes and colors to define the various pilot-oriented display classifications. All the weather information needed for flight operations within the satellite coverage area is transmitted from the satellite to all aircraft operating within that coverage area. The suitably coded weather data for transmission from the ground could be either coded directly into airport categories, weather elements and other classifications or, alternately, the alpha-numeric data could be sent for classification into airport categories, weather elements, list depiction, etc., by the on-board processor of each airplane using the alpha-numeric data.

A suitable control system, such as a non-keyboard control system, is employed by the pilot to select the data to be displayed. The automatic selection of the map area for display of the weather data is based on the route and time for the flight programmed into the airborne processor by the pilot. Thus, near real-time display of surface and aloft weather information and forecasts are continuously available to the pilot in unique map-type depiction as well as alpha-numeric formats tailored to the pilot's operational needs and may be employed for preflight planning before take-off or during flight. In addition, displays of route cross sections, showing near real-time and forecast routine and hazardous weather data, along with the terrain profile and planned altitudes profiles, are continuously available for display.

Overlays of near real-time interrelated products, such as mosaicked ground weather maps, lightning, Significant Meteorological Statements (Signets), and the like, on the surface weather depictions are also made continuously available to the pilot over the data link.

BRIEF DESCRIPTION OF THE DRAWINGS

A more complete appreciation of the invention and many of the attendant advantages thereof will be more readily apparent as the same becomes better understood by reference to the following detailed description when considered in reference to the accompanying drawings wherein.

DETAILED DESCRIPTION

Figure 1:
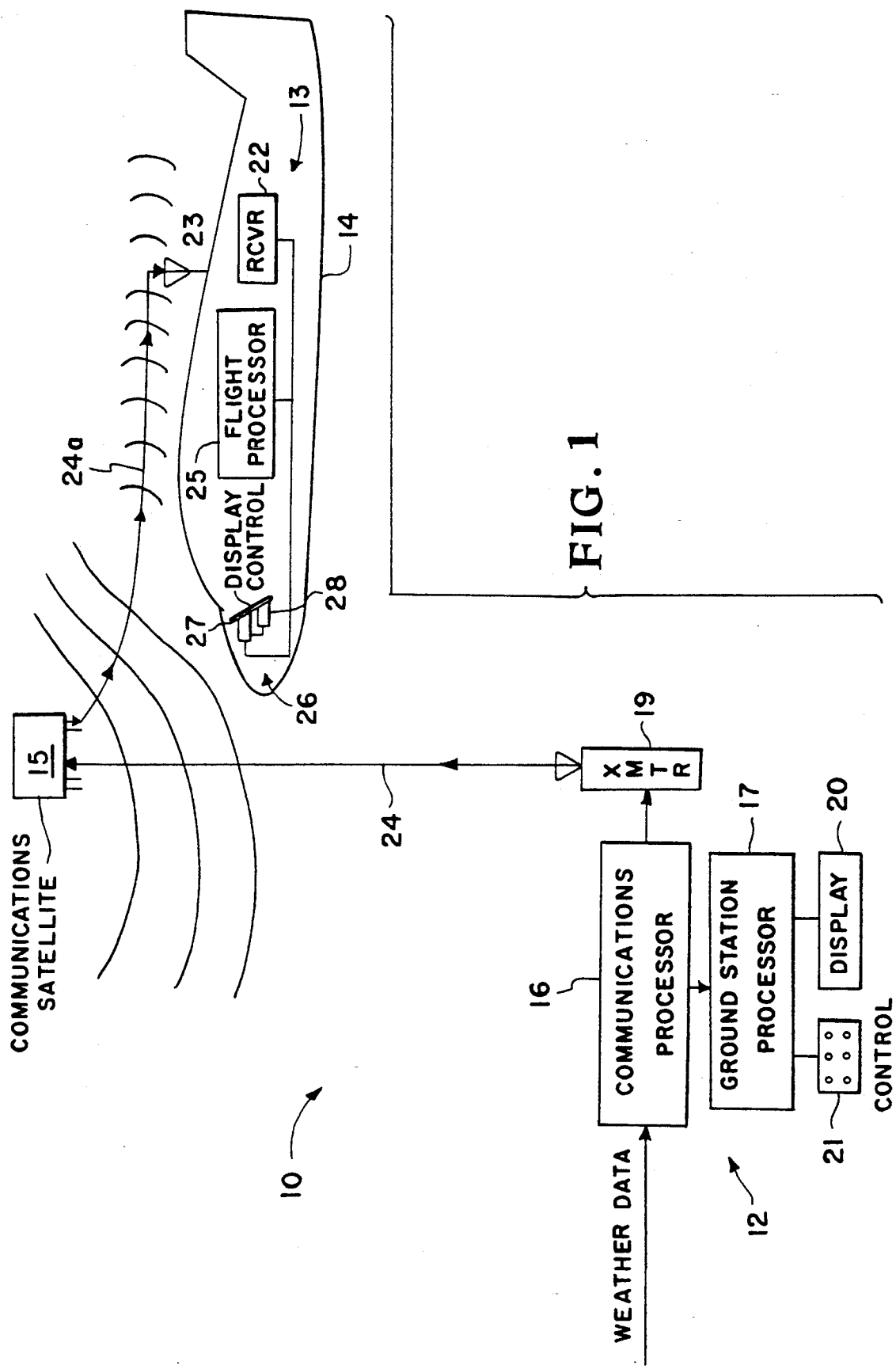
FIG. 1 is a schematic representation of the pilots automated weather support system of the present invention.

Referring now to the drawings, and more particularly to FIG. 1, a schematic representation of the Pilots Automated Weather Support System of the present invention is shown and designated generally by reference numeral 10. System 10 includes a ground subsystem 12, an airborne or flight subsystem 13 disposed on-board an aircraft 14, and a communications satellite 15. Ground subsystem 12 includes a communications processor unit 16 that receives all conventional weather information for the coverage area of the satellite broadcasting system of satellite 15. This weather information is automatically checked and edited for quantitative and format errors before being packaged into compressed data blocks. These data blocks are simultaneously transmitted to local ground station processor unit(s) 17 and to a transmitter (XMTR) unit 19. The local ground station processor unit 17 converts the assimilated data blocks into appropriate displays for ground display unit 20 as directed by the operator of a control panel 21. Multiple ground station processors 17, with display units 20 and control panels 21, may be connected to a single communications processor 16, and located at selected or all airports in a specific region, for preflight briefing support by a pilot, as needed.

The data blocks are broadcast as an up-link data stream, typically at 6 Ghz, by transmitter 19 and received by a suitable satellite 15, such as a Geostationary Communications Satellite. The satellite system rebroadcasts the data as received, typically at 1.6 Ghz, in a down-link data stream 24a. The rebroadcast data link 24a is picked up by antenna 23 of aircraft 14. Receiver (RCVR) 22 on board aircraft 14 conveys the received data from satellite 15 to flight processor 25. Flight processor 25 decodes and/or converts the received data blocks into graphic depictions that are conveyed to display/control instrument 26. The graphic depictions received by display/control instrument 26 are displayed on flight display screen 27, on command by the pilot and through controls on control panel 28, as will be further explained hereinafter.

The weather data received by communications processor 16 includes (but is not limited to) airport cloud cover and visibility, precipitation information, wind data, and other airport surface observations, airport terminal forecasts and near real-time ground weather radar mosaics.

Figure 2:
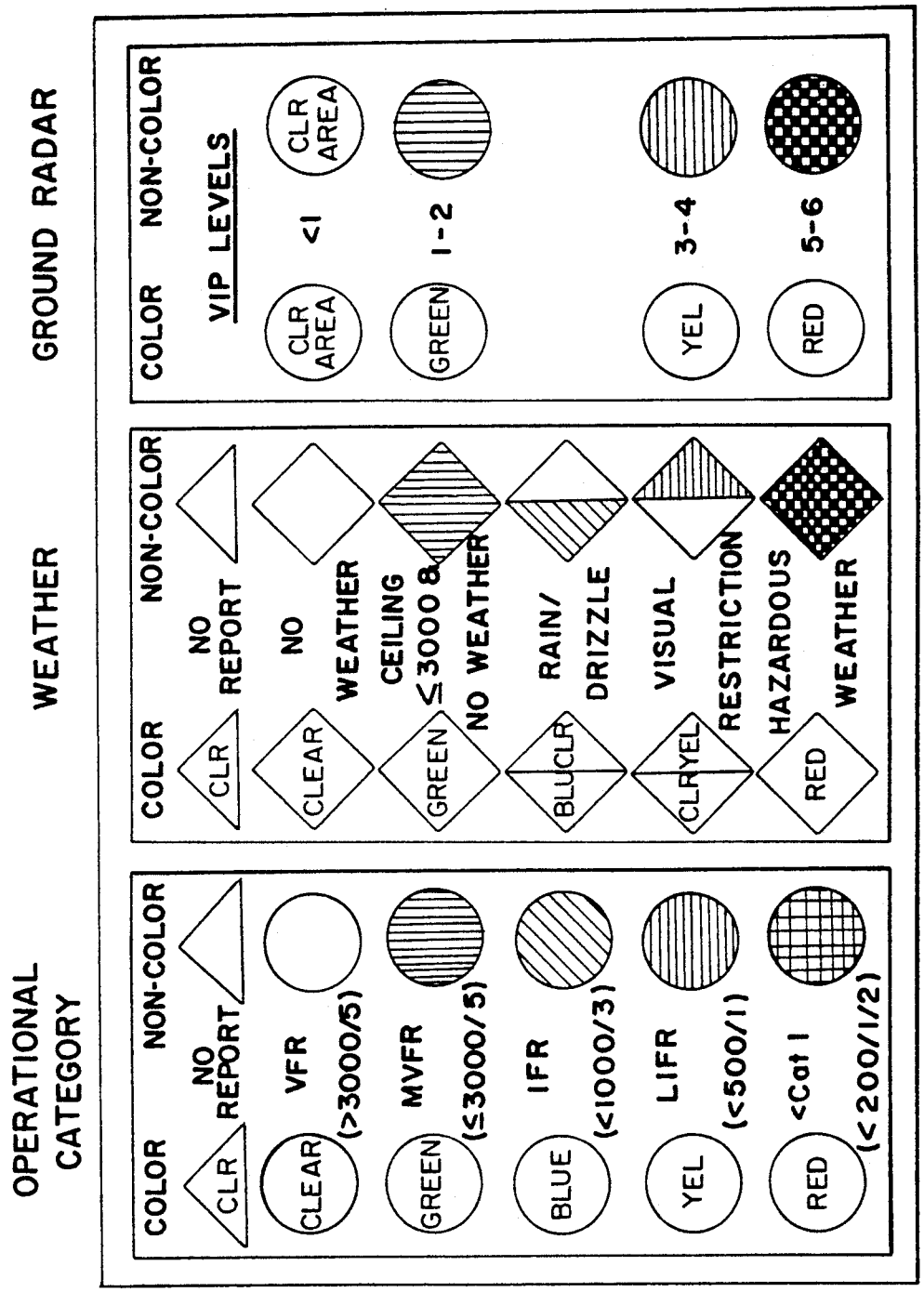
FIG. 2 is a view of a chart showing the symbol and color weather classification keys employed with the present invention along with black and white equivalents for use in the description herein.

By encoding the ceiling visibility, present weather and precipitation into operationally useful classification levels, the results may be displayed on-board flight display screen 27 by unique map-type depictions. Although these unique weather map symbols will normally be of various colors, for purposes of illustration herein, the non-color counterparts are also illustrated in the Symbol Classification Key of FIG. 2 for Operational Category, Weather and Ground Radar information and in the "Legends" for the other FIGS. The "Legends" designating the non-color symbols in the various figures are available to the pilot for display on flight display screen 27, as needed, and may be shown separately or as an overlay for the display being shown, as directed by the pilot. In displaying the Operational Categories, the five existing ceiling and visibility levels shown are representative of Visual Flight Rules (VFR), Marginal VFR (MVFR), Instrument Flight Rules (IFR), Low IFR (LIFR) and less than Category I IFR Conditions. The Weather Classifications represent significant weather elements which may impact on airport operations varying from hazardous weather that may involve thunderstorms and ice forms, to non-hazardous weather elements, including visibility restriction, to rain forms, to clouds only, to no weather.

The Ground Radar classifications are based on the Video Integrated Processor (VIP) assessments of the precipitation intensities from the current National Weather Service (NWS) weather radars.

Using these classification types, many different levels of automated weather support system depictions may be developed. A number of examples of the type of depictions that may be developed using the weather types (1) surface observations, (2) terminal forecasts and (3) ground radar, and applying the data classification keys shown in FIG. 2 for Operational Category and Weather, are found in the matrix of Table I below:

TABLE 1

| WEATHER DATA TYPES | | | |
|---|---|---|---|
| Data Analysis | Surface Observations | Terminal Forecasts | Ground Radar |
| Operational Category | Airport Category | Synoptic Forecast Category Route Forecast Category (Time Phased) | |
| Weather | Airport Weather | Synoptic Forecast Weather Route Forecast Weather (Time Phased) | Precipitation Depictions |
| Combined Analysis | | | |
| Trends | Airport Category Trend = | Observed Category vs Forecast Category | |
| | Airport Weather Trend = | Observed Weather vs Forecast Weather | |
| | List = | Observed Airport Category and Weather vs Forecast Airport Category and Weather | |

It is readily seen from Table I that it is possible to create forecast depictions for the same time (synoptic view), or time-phased, along the aircraft route based on the applicable forecast. By combining some of these depictions, weather trends may be developed that depict the representativeness or accuracy of the forecast conditions. This is facilitated by comparing the actual surface observations with the applicable terminal forecasts over the preceding three hours.

Software has been developed for reading the surface observations and terminal forecasts from conventional FAA data service and automatically creating these depictions and other weather observations on a personal computer (286 PC with EGA). FIGS. 3–6 were drawn from depictions created on a Mackintosh computer.

Figure 3:
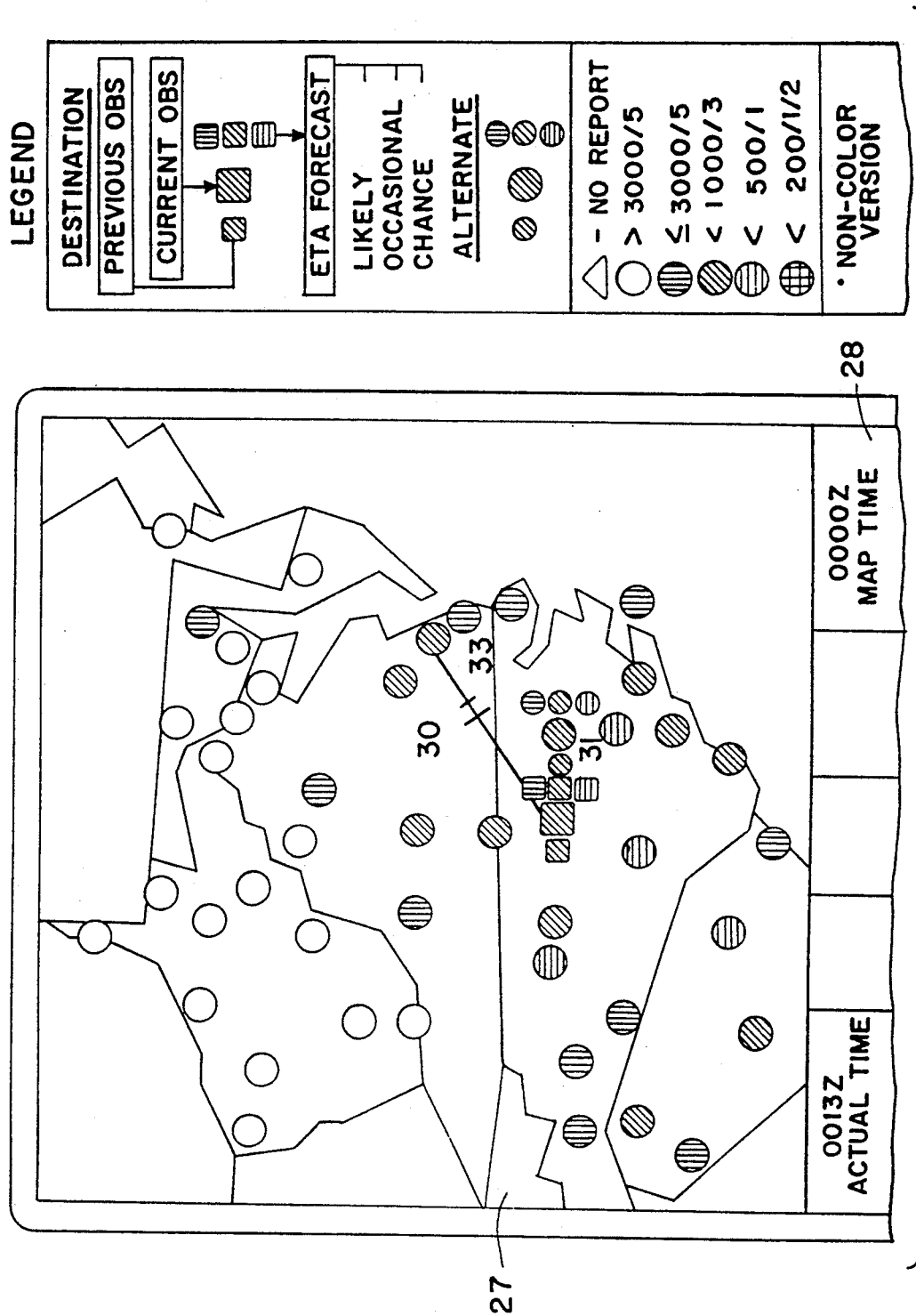
FIG. 3 is a view of a specific background geographic map area and illustrating airport operational category depictions on the flight display screen on-board an aircraft and showing a legend block for a non-color version.

Referring now to FIG. 3, the Airport Operational Category depiction is illustrated. As shown therein, the appropriate map-area for the flight is shown on the flight display screen 27 as background with the airport ceiling and visibility being depicted thereon in pilot-oriented operational categories, as shown by the Legend for the non-color version. The ceiling and visibility category status for each airport being considered may be determined by the software of on-board flight processor 25, using surface observation data included in each data block transmission over data links 24, 24a. A solid course line 30 is drawn between the departure airport (Newport News-Williamsburg International) and destination airport (Raleigh-Durham) with a dotted line 31 being drawn from the destination to the alternate airport (Rocky Mount).

The airplane position along the route is also continuously displayed and designated by reference numeral 33. Some additional information is also shown for the Destination and Alternate airports. At the nine O'Clock position the category for the last observation is shown while at the two, three and four O'Clock positions, the categories depicted represent the Operational Category valid at the flight estimated time of arrival (ETA) based on the current valid terminal forecast. As shown in the Legend block, the top or two O'Clock square is color coded based on the "likely" element of the Terminal Forecast or amendment, the middle or three O'Clock square is color coded based on the "occasional" element and the bottom or four O'Clock square symbol is color coded based on the "chance" element. Only those elements indicated in the applicable forecasts are used and therefore there could be one, two or three forecast symbols employed to the right of the Destination and Alternate airport symbols depending upon whether the forecast contains the "likely", the "likely" plus "occasional", or the "likely", "occasional" and the "chance". The same symbology is used for the Alternate airport except that a circular symbol of the same relative size as the Destination airport square is employed.

The current Zulu time (actual time) and valid time for the map display (map time) are also shown on this display. The last three hours of this depiction are stored in the on-board memory of flight processor 25 for subsequent display in a loop fashion on demand by the pilot of aircraft 14. The type of display indicating the Category forecast and the ETA at each airport under consideration will clearly indicate which airports are acceptable for various modes of operation. A variation of this display to provide a depiction of the Airport Operational Category trends, using a single symbol for each airport in the coverage region, may also be employed.

Figure 4:
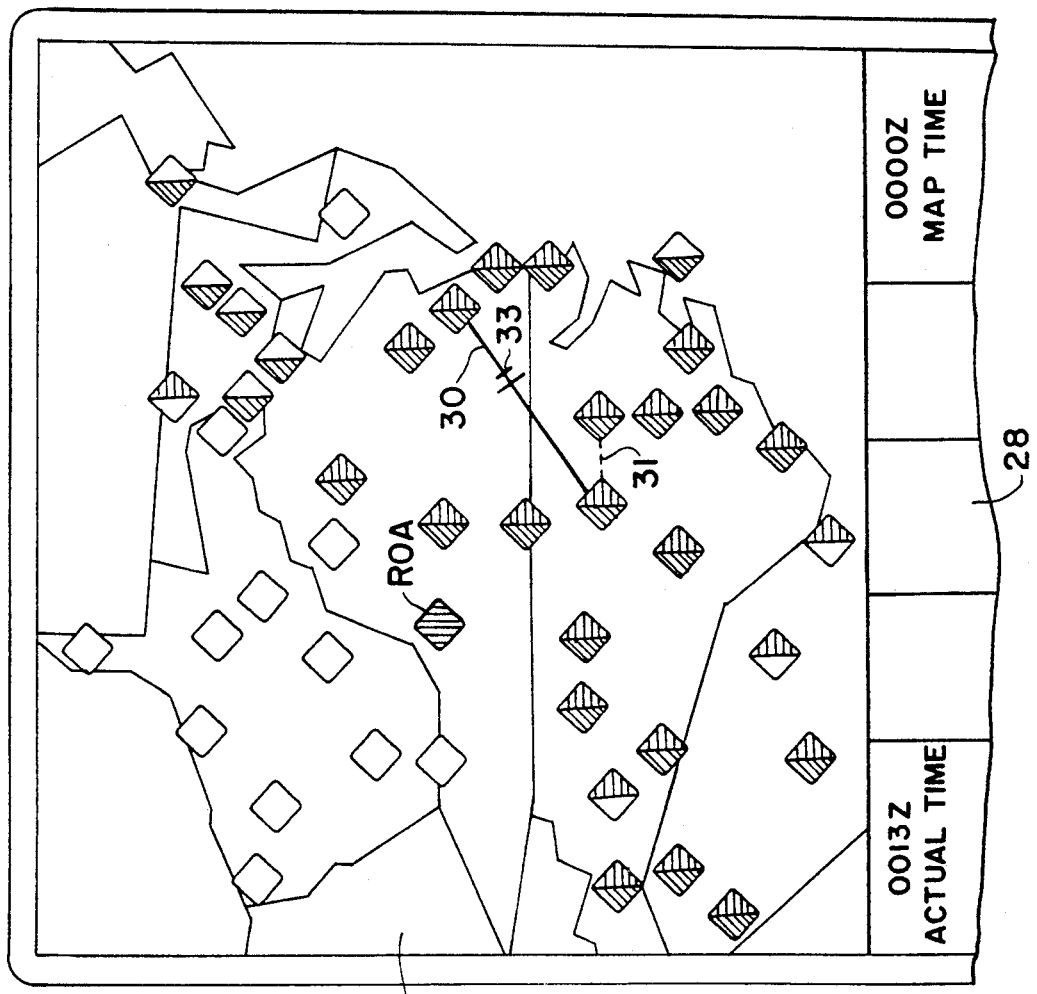
FIG. 4 is a view of the flight display screen shown in FIG. 3 and illustrating the airport weather element depictions in conjunction with the same background map area and showing a non-color legend for this display.

Referring now to FIG. 4, the Airport Weather Element Depiction is illustrated. As shown therein, the current weather elements are read from the surface observations and displayed for each airport on the map area of the display in the seven ways shown in the legend. Hazardous weather conditions are considered Priority I conditions and, include thunderstorms, hail, freezing rain and drizzle, sleet, sleet showers, ice crystals, snow, snow showers, and snow grains or pellets. Visibility Restriction conditions are considered Priority II conditions and include fog, ground fog, ice fog, haze, smoke, dust, blowing dust, blowing sand/snow/spray. The other symbols of the seven legends are self explanatory. Priority III conditions are where the ceiling is greater than 3000 feet and no weather is observed. Roanoke (ROA) airport meets this criteria in the FIG. 4 illustration. Also, it is to be noted that Priority II symbols are split, as shown, and are never colored solid with one color. A station symbol may be colored with Priority II Blue on the left, for example, and Priority II Yellow on the right to indicate rain/drizzle and visual restrictions. As in the Airport Operational Category depiction of FIG. 3, the last three hours of the Airport Weather Element depictions of FIG. 4 will be stored in the on-board memory of flight processor 25 for display in a loop fashion on demand by the pilot of aircraft 14. The definition of the airport weather classifications, as well as the airport categories, may be changed to meet the needs of the pilot and his mission.

Figure 5:
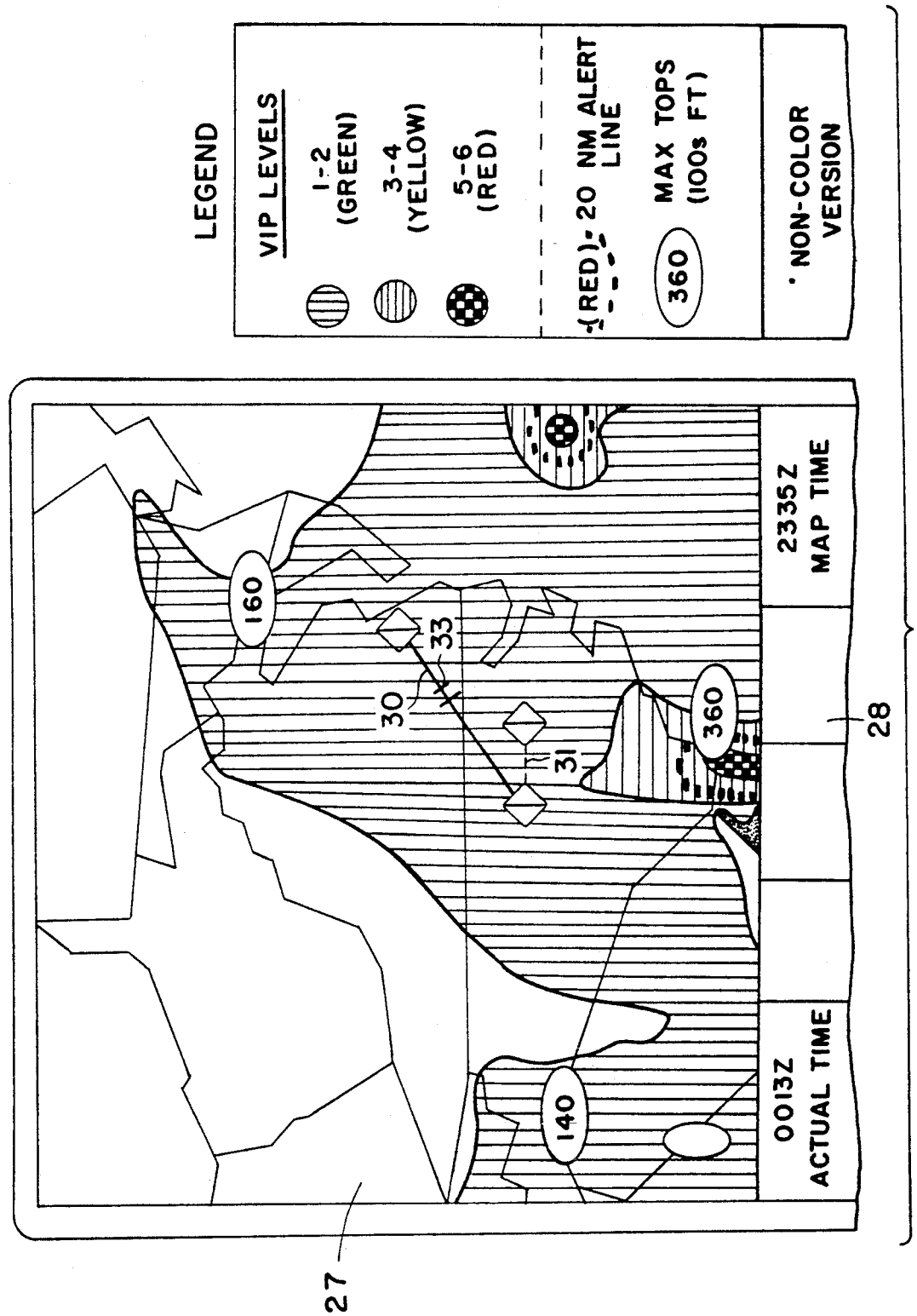
FIG. 5 is a view of the flight display screen shown in FIGS. 3–4 illustrating the ground weather radar depiction, and a non-color legend, for the same background map area at a specific time.

Referring now to FIG. 5, the Ground Weather Radar depiction is illustrated. This depiction example shows the radar precipitation intensity levels over the illustrated map area. The intensity levels and color codes are shown in the legend. Radar top altitudes are shown in hundreds of feet and a flashing red contour "Alert" line is shown outside each red boundary. Current weather reporting systems presently employed make this data available on the ground 60-90 minutes after-the-fact. It is anticipated that the automated weather support system of the present invention will access near real-time radar mosaic data at least as often as 15 minute intervals. The last three hours of these Ground Weather Radar Depictions will be stored on-board aircraft 14 in flight processor unit 25 and displayed in a loop fashion on demand by the aircraft pilot. This data may also be overlaid or superposed over the Airport Weather Element and Airport Operation Category depictions on demand by the pilot.

Figure 6:
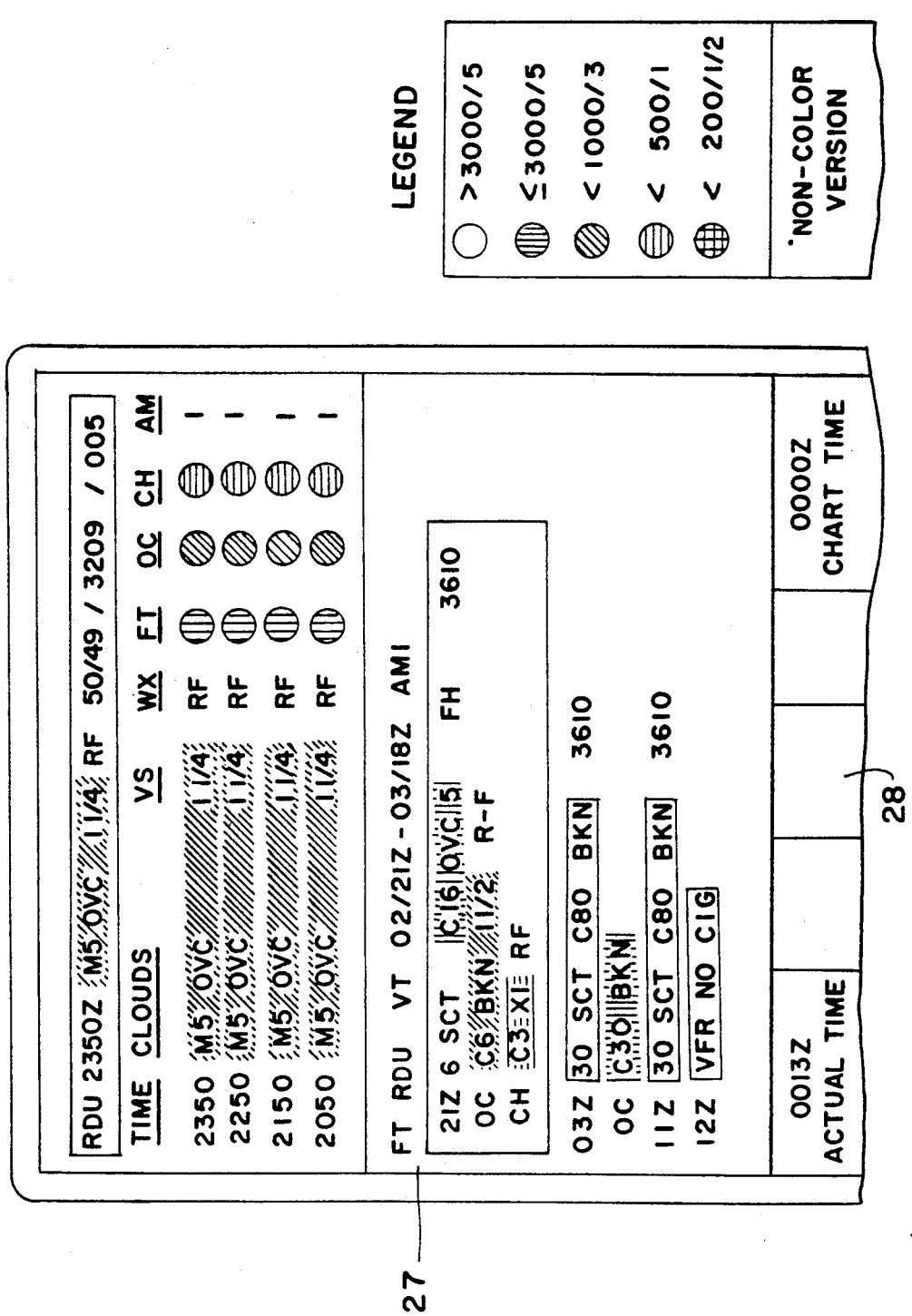
FIG. 6 is an illustration of a selected airport "list" depiction shown on the flight display screen (and a non-color legend) wherein the current observation and terminal forecast are shown along with a summary listing comparing various elements of previous observations with the forecast that was valid at the observation time; and, FIG. 7 is a view of the on-board control system and display screen illustrating the same specific background map area as shown in the screen displays of FIGS. 3–6.

Referring now to FIG. 6, the display of the Selected Airport "LIST" depiction is illustrated. In this display the current surface observations, including appropriate added remarks, are displayed completely at the top area thereof. Thus, the top line of FIG. 6 conveys the information that at Raleigh-Durham airport, at 2350 Zulu observation, there was a measured 500 feet overcast; visibility was 1¼ miles; rain and fog present; temperature 50 degrees Fahrenheit; Dewpoint 49 degrees F.; wind blowing from 320 degrees at 9 knots and the altimeter setting was 30.05. The depicted observations can be wrapped around to a second or third line, as necessary.

In the following observation summary block of FIG. 6, the current and last three hours of observations, including the specials, are shown in descending chronological order with only the two lowest cloud layers, visibility and present weather being displayed. The illustrated listing shows the observed conditions at RDU have been the same since 2050Z or for the last three hours. Forecast conditions are depicted in the three columns to the right, using the color symbology used for the observed conditions, thus facilitating comparison. The FT column represents the "likely" portion of the forecast, OC represents the "occasional" portion of the forecast and CH represents the "chance" portion. The AM column will list the amendment number, as appropriate, for the forecast being displayed. At each observation time, the applicable Airport Operational Category, based on the terminal forecast or amended forecast valid at that time, is shown to the right by the superimposed color highlighting.

The current valid forecast is also shown in alphanumeric form below the observation summary block with the forecast being reformatted into separate time block entries. Thus, the Terminal Forecast (FT) valid time (VT) for the second day of the month from 2100Z time to the third day of the month at 1800Z, as given in Amendment 1 (AM1) is:

From 2100Z to 0300Z;
  600 feet scattered clouds, ceiling with 1600 overcast clouds, visibility 5 miles, fog and haze, wind from 360 degrees at 10 knots, Occasionally (OC) ceiling with 600 feet broken clouds, visibility 1½ miles, light rain and fog, with a Chance (CH) of ceiling at 300 feet with obscuration, 1 mile visibility, rain and fog.
From 0300Z to 1100Z;
  3000 feet scattered clouds, ceiling with 8000 feet broken clouds, winds from 360 degrees at 10 knots, Occasionally (OC) ceiling with 3000 feet broken clouds.
From 1100Z to 1200Z;
  3000 feet scattered clouds, ceiling with 8000 feet broken clouds, winds from 360 degrees at 10 knots.
From 1200Z to 1800Z;
  Visual Flight Rule conditions with no ceiling.

Color highlighting is used on each cloud and visibility portion of the surface observations and each line of the terminal forecast. It is readily seen in this illustration, from the "colors" alone, that the weather at Raleigh (RDU) has been worse than the FT or "likely" part of the forecast and has, in fact, been equal to the "occasional" part of the amended forecast for the last three hours.

Figure 7:
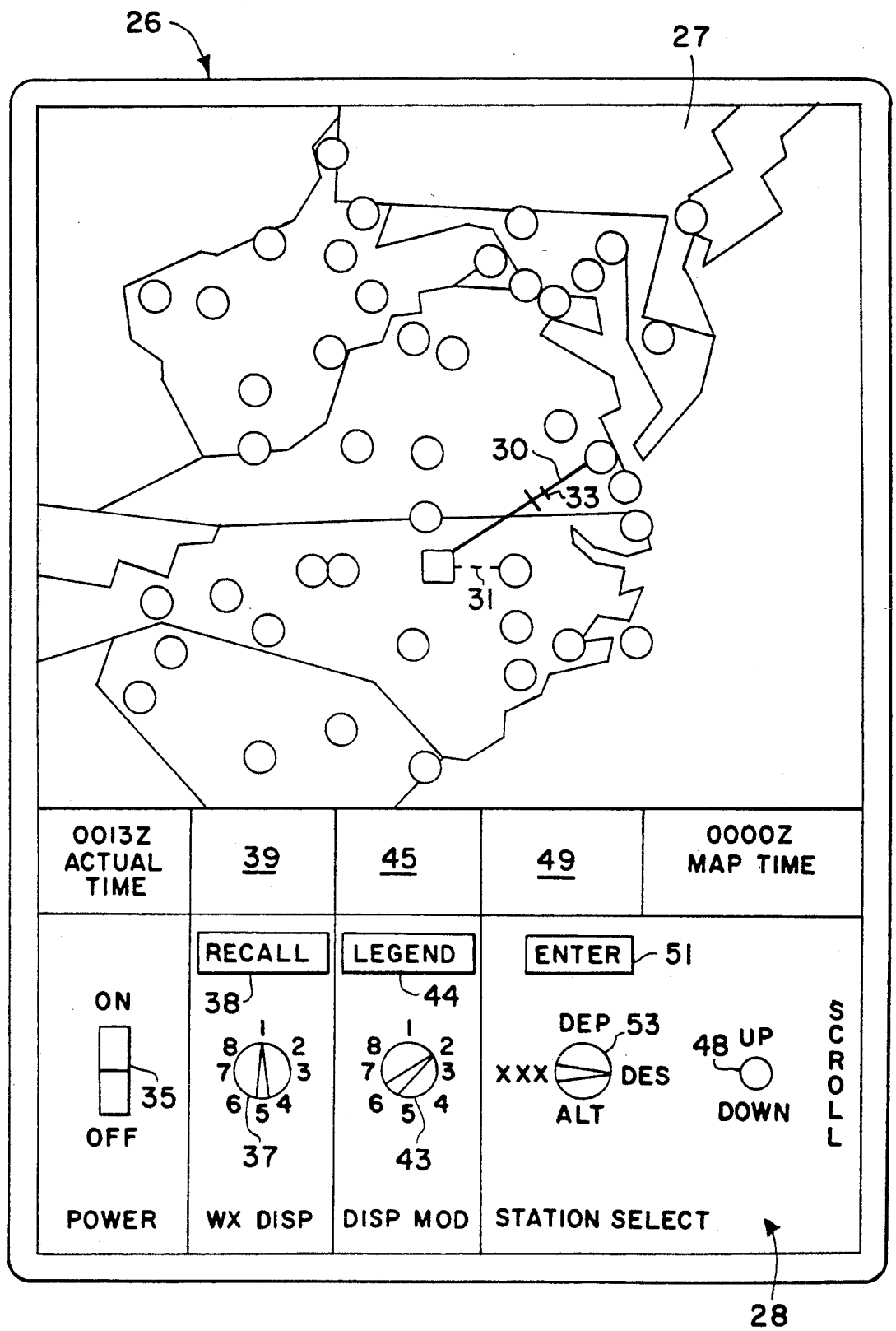

Referring now to FIG. 7, the display-control instrument 26 on-board aircraft 14 is illustrated. The rotary knobs and buttons on control panel 28 control the operation of the entire airborne or flight subsystem 13.

These controls, through the software of flight processor 25 permit the pilot to selectively display, on flight display screen 27, any information transmitted over data links 24 and 24a from communication processor 15 to flight processor 25. Thus, the pilot is able to selectively (1) display any of the four basic displays; (2) loop any of the map depictions; (3) zoom any map depiction to a higher resolution and bring up any stations eliminated by the clutter algorithm; (4) display or remove the appropriate legend on any map depiction; (5) overlay the applicable radar mosaic on any map depiction; (6) determine the location of any station by its alpha-numeric identification; (7) designate any airport as Departure, Destination or Alternate; and (8) select an arbitrary airport for the LIST display.

In addition, when a hazardous weather element or below Category I condition is received in any data block, the software of the system is designed to automatically interrupt the screen display and show the appropriate hazardous information display until manually canceled by the pilot.

The section of control panel 28 labeled "POWER" contains power switch 35 movable between the On-Off positions indicated for control of the electrical power to the entire airborne or flight subsystem 13.

The section of control panel 28 labeled "WX DISP", an abbreviation for "Weather Display", is provided with a weather display rotary knob 37 and a push button 38 labeled "RECALL". Weather display rotary knob 37 is selectively and rotatably moved to any one of the locations thereof indicated by the numerals 1-8. Only six of these positions are presently used with the positions 7 and 8 being retained as back-up or for future use. The six positions presently used effect display (on flight display screen 27) of the depictions shown in Table II below. The abbreviated Title of these selected depictions shown in the Table are displayed, as selected, on the lighted small rectangular screen window 39 disposed directly above panel section "WX DISP".

TABLE II

| ROTARY KNOB POSITION | TITLE |
| --- | --- |
| 1. Operational Categories | (OPS CAT) |
| 2. Weather Elements (if not previously selected) | (WXEL) |
| 3. Ground Radar Mosaic | (RADAR) |
| 4. LIST for Airport designated by "STATION SELECT" | (LIST) |
| 5. Actual vs FT WX Element Comparison | (WX COMP) |
| 6. Actual vs FT Category Comparison | (CAT COMP) |

RECALL push button 38, as the legend implies, places the last previous depiction shown on flight display screen 27 on display again. When activated, RECALL push button 38 stays depressed and illuminated. Pushing RECALL push button 38 a second time, or while it is depressed, causes the display on flight display screen 27 to revert to its previous status while RECALL push button 38 returns to the normal position and turns off the illumination thereof.

The section of control panel 28 labeled "DISP MOD", an abbreviation for Display Modification, is provided with a display modification rotary knob and a LEGEND push button as designated, respectively, by reference numerals 43,44. The DISP MOD section modifies the WX DISP section, as will be further explained hereinafter. Display modification rotary knob 43 is selectively rotated to any one of the locations thereof indicated by the numerals 1-8. Only the first four (1-4) of these positions are presently used with the remaining four (5-8) positions being retained as back-up or for future use. Positions 1-4 effect display of the depictions shown in Table III below. The abbreviated title of the depictions are displayed, as selected, on the lighted small rectangular screen window 45 located directly above the panel section DISP MOD.

TABLE III

| DISPLAY MOD ROTARY KNOB POSITION | TITLE |
| --- | --- |
| 1. Basic display as called for by WX DISP- (No Modifications) | (BASIC) |
| 2. LOOP - Causes last three hours of WX DISP to be shown in positive time animation at a speed of 1000 times real time | (LOOP) |
| 3. ZOOM - Causes display to zoom WX DISP centered on airport designated by STATION SELECT. Any station and data eliminated by automatic declutter is restored on the ZOOMed display. | (ZOOM) |
| 4. ID - Provides three letter A/N station code for each airport displayed on any Map Depiction. Weather data is suppressed. | (ID) |

LEGEND push button 44 effects display of the appropriate legend (FIGS. 3-6) on screen window 45 for what is being displayed on flight display screen 27. LEGEND push button 44 is illuminated when initially depressed and when depressed a second time, returns to the original position, is no longer illuminated and the legend display on flight display screen 27 is removed. The lighted screen window 45 continues to indicate the appropriate display modification being shown on flight display screen 27, depending upon the numbered position of display modification rotary knob 43.

The section of control panel 28 labeled "STATION SELECT" includes a scroll lever 48 that provides the ability to place any airport three letter identification (ID) in station display screen window 49 disposed above "ENTER" push button 51. Scroll lever 48 has a neutral center position and up and down scroll speed that increases non-linearly with deflection. Scrolling is alphabetically performed from a stored listing of all three letter airport identifications in the satellite coverage area.

A station select rotary knob 53 provides the ability to designate the airport whose ID is shown in station display window 49. The twelve O'Clock position of station select rotary knob 53 indicates the position to select the departure airport, as designated by the letters "DEP". The three O'Clock position of station select rotary knob is labeled "DES" for designation of the destination airport, while the labels ALT and XXX at the six and nine O'Clock positions, respectively, designate the alternate and an arbitrary airport for which the LIST depiction is desired.

ENTER button 51 is used to enter the airport and function selected by station select knob 53 into flight processor 25 for use in configuring the displays on flight display screen 27 by control panel sections WX DISP and DISP MOD.

The operation of display/control instrument 26 is now believed apparent. When DEP, DES, ALT or XXX is selected by station select knob 53, the LIST display (FIG. 6) will be for the Departure, Destination, Alternate or Arbitrary airport, respectively. When DEP, DES, ALT, or XXX have been selected and entered, as described, all map-type depictions will show a solid black line from the Departure airport to the Destination airport and a dotted line from the Destination airport to the Alternate airport. These lines will not be drawn over any weather data display symbol.

When the arbitrary airport is selected and entered, using the XXX position of station select rotary knob 53 as described, the appropriate airport symbol on the map type display will blink for a short time. While this station is so displayed, if ZOOM is selected on DISP MOD, the weather display selected by WX DISP is zoomed with the XXX airport at the center of the display.

When a Hazardous Weather Element or Operational Category element is initially received and analyzed as such, the appropriate WX DISP will be presented on flight display screen 27 and RECALL push button 38 will flash until depressed. When RECALL button 38 is depressed in this mode, the display on flight display screen 27 will revert to its previous type of display. To hold the alarmed display, the WX DISP rotary knob 37 is rotated in a clockwise direction until the RECALL light goes out leaving the Hazardous Weather depiction display on screen 27.

Although the illustrative specific example of the invention has been described herein relative to limited data types and for a specific flight in a confined local area, it is not so limited. Alternate data types and the use of multiple spaced ground subsystems 12 (but with a single transmitter 19) are obviously intended to be within the scope of the present invention. The invention is intended to include automatic depictions based on the data types discussed herein and additional available data such as area forecasts, winds and temperature aloft, lightning location and intensity, Convective SIGMETS, SIGMETS, AIRMETS, PIREPs, as well as on-board aircraft precipitation, wind and temperature measurements. Also software for automatically determining acceptable airport locations during preflight planning is provided for Ground Station Processor 17 and software for in-flight system procedural guidance is available on demand by the pilot in on-board processor 25.

For cross-country flight, single or multiple satellites with overlapping coverages may be employed to provide satellite coverage area over the entire United States. Electronically positioned (stationary or moving) map displays may be employed on flight display screen 27. As developed, the automated weather support system of the present invention will include new data from the planned National Weather Service AWIPs-90 (Advanced Weather Information Processing Service for the 1990s) and the FAA aviation weather system improvements including the Next Generation Radar (NEXRAD) and Terminal Doppler Weather Radar (TDWR) data, NWS and FAA automated surface observations, and the near real-time upper level winds measured by the NWS Profilers. It is contemplated that all this data may be added to the present system in the future by new data link technology.

In an experimental model of the present invention the weather data is collected on a VAX computer with communications provided by the Geostar Satellite Communications System and including elements of the SONY 2-Wayfarer antenna and receiving system. The on-board processor is an Ergo Computing "Brick" PC and the display is a backlighted active matrix Color Liquid Crystal Display by Hitachi. For production models of the present invention, the on-board processor may be incorporated into other on-board processors such as that provided for flight management and the display may utilize an existing display such as a color weather radar display, or an electronic flight information display screen.

Thus, although the invention has been described relative to specific embodiments thereof, it is not so limited and various modifications and variations thereof will be readily apparent to those skilled in the art in the light of the above teachings.

What is claimed as new and desired to be secured by Letters Patent of the United States is:

1. An automated weather support system for providing systematic, updated, weather information from the ground to the pilot of an aircraft, comprising:
   (a) communications processor means disposed on the ground for continuously gathering, assimilating and editing available routine surface and aloft weather information from a variety of sources over a specific surrounding area and for converting the edited weather information into digital weather data blocks;
   (b) transmitter means for systematically and automatically transmitting the digital weather data blocks in discrete time windows and including automatic alert for hazardous weather changes;
   (c) satellite communication means for receiving the transmitted digital weather data blocks of weather information and broadcasting said digital weather data blocks to all aircraft in the air and on the ground within the satellite coverage area;
   (d) receiver means carried by an aircraft for receiving the broadcast digital weather data blocks;
   (e) flight processor means carried by the aircraft for converting the digital weather data blocks received by said receiver means into specific weather map and pictorial depictions tailored to the operational needs of the pilot;
   (f) display and control instrumentation for displaying said converted weather map and pictorial depictions, on command, to the pilot of the aircraft;
   said display and control instrumentation including a flight display screen for displaying said specific weather map and pictorial depictions to the pilot of the aircraft and a control panel having a series of buttons and knobs to permit the pilot to select the information to be displayed on said display screen;
   said control panel including a weather display section, a weather display rotary knob having a pointer thereon disposed on said weather display section, a plurality of fixed numerical indicia circumferentially disposed in spaced relationship about said weather display rotary knob, said weather display rotary knob being selectively movable by the pilot to position said pointer directed toward any one of multiple positions indicated by said numerical indicia, each one of said numerical indicia indicating at least one of multiple selections of weather map and pictorial depictions available for display on said flight display screen from specific weather data received by said receiver means and processed by said flight processor means.

2. The automated weather support system of claim 1 including a recall push button disposed on said weather display section of said control panel, said recall push button, when depressed once, remaining depressed and becoming illuminated while effecting replacement of the present display on said flight display screen with the last previous depiction shown on said flight display screen, and when said recall button is depressed a second time, effecting the display on said flight display screen to revert to its previous status while returning said recall push button to its normal and unlighted status.

3. The automated weather support system of claim 1 including a lighted screen window disposed above said weather display section of said control panel to visually indicate to the pilot the title of the weather information being displayed on said flight display screen.

4. The automated weather support system of claim 1 including a display modification section on said control panel, said display modification section having a display modification rotary knob provided with a pointer thereon, said display modification section modifying said weather display section and including a plurality of fixed numerical indicia circumferentially disposed in spaced relationship about said display modification rotary knob, said display modification rotary knob being selectively movable by the pilot to position said pointer directed toward any one of multiple positions as indicated by said numerical indicia, each of said indicia indicating one of multiple positions of said display modification rotary knob for effecting the display modification on said flight display screen of the weather information displayed in response to pilot action of said weather display section of said control panel.

5. The automated weather support system of claim 4 including a lighted screen window disposed above said display modification section, a legend push button provided between said display modification rotary knob and said lighted screen window disposed above said display modification section, said legend push button, when depressed once, becoming illuminated and remaining depressed while effecting display of the appropriate legend on said flight display screen for the display modification being shown, and said legend push button, when depressed a second time returns to the original position, is no longer illuminated, and the legend display on said flight display screen is removed, said lighted screen window disposed above said display modification section indicating the appropriate display modification being shown on said flight display screen depending upon the numbered position of said display modification rotary knob.

6. The automated weather support system of claim 1 including a station select section on said control panel, said station section including a station select rotary knob having a pointer thereon, fixed indicia disposed at ninety degree intervals about said station select knob, said fixed indicia representing (a) departure, (b) destination, (c) alternate, and (d) arbitrary airports, and said station select rotary knob being sequentially rotated between each of said indicia for the pilot to designate an airport for each representation.

7. The automated weather support system of claim 6 including,
a scroll lever provided on said station select section, said scroll lever being selectively movable from a neutral center position to an up or down position,
a station display screen window disposed above said station select section of said control panel,
said scroll lever effecting movement of a stored alphabetical listing of airport identification letters on said station display screen window, and
an enter push button disposed between said station select rotary knob and said station display screen window, whereby when said station select knob is pointed to the departure position and the airport identification letters for the departure airport appear on said station display screen window, movement of said scroll lever to the neutral position and depressing said enter push button enters the departure airport into said flight processor means, the pilot then rotates said station select knob to point to the destination position and the scroll lever actuated until the destination airport identification appears on said station display screen window where said scroll is again neutralized and the destination airport entered into said processor means by depressing said enter push button, the alternate and arbitrary airports are selected and the information entered into said flight processor means and all map depictions displayed thereafter on said flight display screen by said weather display and said display modification sections of said control panel will show a background map of the area surrounding the designated departure, destination and alternate airports with a solid black line being shown between the departure and destination airport and a dotted line disposed from the destination airport to the alternate airport.

8. The automated weather support system of claim 1 including at least one ground station processor unit for receiving the edited digital weather data blocks from said communications processor means and including at least one control and display unit, said ground station processor serving to convert the digital weather data blocks received into specific weather map and pictorial depictions for display by said at least one control and display unit for use in preflight planning by pilots.

9. An automated weather support system for automatically providing systematic, updated weather information from the ground to the pilot of an aircraft operating over the continental United States or other large area without requiring the pilot to request weather information from any communications facility or to identify the aircraft or its position to any air traffic control facility or other communication facility on the ground, comprising:

(a) at least one ground station including a communications processor means and a transmitter means, said communications processor means serving to continuously gather, assimilate and edit digital available surface and aloft weather data observations, updates and forecasts, including hazardous weather areas, from a variety of sources over the entire continental United States or other large area, in discrete digital weather data blocks, said transmitter means receiving said discrete digital weather data blocks from said communications processor means and systematically and automatically transmitting said digital weather data blocks in discrete time windows;

(b) a satellite communications system for receiving the transmitted digital weather data blocks from said transmitter and automatically broadcasting said digital weather data blocks to all aircraft in the air and on the ground within the continental United States or satellite communication coverage area;

(c) a flight system carried by the aircraft and having a receiver to automatically receive said digital weather data blocks from said satellite communications system;

(d) said flight system including flight processor means in communication with said receiver to automatically process said digital weather data blocks received into weather map and pictorial depictions tailored to the operational needs of the aircraft pilot;

(e) said flight processor means being programmable by the pilot to automatically select the map area for display of the weather map and pictorial depictions based on the flight departure airport and destination airport or other parameters programmed into said flight processor means by the pilot;

(f) said flight system including display and control instrumentation for displaying said weather map and pictorial depictions along the planned route between said departure and destination airports as processed by said flight processor means;

(g) said flight processor including near real-time automatic processing and comparison of surface weather observations with the applicable forecast in both text and said weather map and pictorial depictions;

(h) said display and control instrumentation including a flight display screen and said flight processor means producing route cross-sections showing near real-time routine and hazardous weather data and forecasts, along with the terrain profile and planned altitude profiles for display on said flight display screen; and (i) overlay comparison means included in said display and control instrumentation permitting comparison of near real-time interrelated mosaicked ground weather radar maps, lightning and said hazardous weather areas, on the surface weather depictions.

10. An automated weather support system for automatically providing systematic, updated, whether information from the ground to the pilot of an aircraft operating over the continental United States or other large area without requiring the pilot to request the weather information from any communications facility or identify his aircraft or its position to any air traffic control facility or other communications facility on the ground, comprising:

(a) communications processor means disposed on the ground for continuously gathering, assimilating and editing available surface and aloft weather observations and forecasts, including hazardous weather areas, from a variety of sources over the continental United States or other large area and for processing the edited weather information into digital weather data blocks;

(b) transmitter means disposed on the ground for receiving the processed digital weather data blocks and for systematically and automatically transmitting said digital weather data blocks in discrete time windows;

(c) an orbiting satellite communications system for receiving and immediately broadcasting said digital weather data blocks to all aircraft in the air or on the ground within the coverage area of said orbiting satellite communications system;

(d) a flight system carried by said aircraft and having a receiver to automatically receive said digital weather data blocks from said orbiting satellite communications system;

(e) said flight system including flight processor means in communication with said receiver to automatically process said digital weather data blocks into weather map and pictorial depictions;

(f) said flight processor means being programmable by the aircraft pilot to automatically select the map area for display of the weather map and pictorial depictions based on the flight departure airport and destination airport or other parameters programmed into said flight processor means by the pilot; and (g) said flight processor means including a display screen and control instrumentation for displaying said weather map and pictorial depictions and the planned route between departure and selected destination airports based on the selection made by the pilot; whereby, said display screen and control instrumentation serves to display near real-time weather observations and forecasts on the surface weather depictions and on the route cross-section weather depictions derived by said flight processor means from the digital weather data blocks broadcast by said satellite communications system, along with the terrain profile and planned altitude profiles along the programmed route.

* * * * *